(12) United States Patent
Kwon et al.

(10) Patent No.: US 7,612,967 B2
(45) Date of Patent: Nov. 3, 2009

(54) METHOD AND APPARATUS COUPLING AT LEAST ONE PIEZOELECTRIC DEVICE TO A SLIDER IN A HARD DISK DRIVE FOR MICROACTUATION

(75) Inventors: Haesung Kwon, San Jose, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 555 days.

(21) Appl. No.: 11/017,540

(22) Filed: Dec. 15, 2004

(65) Prior Publication Data

US 2005/0105217 A1     May 19, 2005

Related U.S. Application Data

(63) Continuation-in-part of application No. 10/903,730, filed on Jul. 29, 2004, now Pat. No. 7,336,436, and a continuation-in-part of application No. 10/757,238, filed on Jan. 13, 2004, now Pat. No. 7,130,160, and a continuation-in-part of application No. 10/713,616, filed on Nov. 13, 2003, now abandoned, and a continuation-in-part of application No. 10/101,809, filed on Mar. 19, 2002, now abandoned, and a continuation-in-part of application No. 10/007,259, filed on Dec. 5, 2001, now Pat. No. 6,940,697.

(60) Provisional application No. 60/530,712, filed on Dec. 18, 2003.

(51) Int. Cl.
*G11B 5/56* (2006.01)
(52) U.S. Cl. .................. 360/294.4; 360/245.3
(58) Field of Classification Search ............. 360/294.4, 360/294.3, 245, 245.3
See application file for complete search history.

(56) References Cited

U.S. PATENT DOCUMENTS

| | | | |
|---|---|---|---|
| 5,189,578 | A | 2/1993 | Mori et al. |
| 5,276,573 | A | 1/1994 | Harada et al. |
| 5,282,190 | A | 1/1994 | Maruo et al. |
| 5,745,319 | A | 4/1998 | Takekado et al. |
| 5,757,573 | A | 5/1998 | Tokuyama et al. |
| 5,764,444 | A | 6/1998 | Imamura et al. |
| 5,802,914 | A | 9/1998 | Fassler et al. |
| 5,805,381 | A | 9/1998 | Resh |
| 5,943,189 | A | 8/1999 | Boutaghou et al. |
| 5,954,079 | A * | 9/1999 | Barth et al. ............ 137/13 |

(Continued)

*Primary Examiner*—Brian E Miller
(74) *Attorney, Agent, or Firm*—Earle Jennings; GSS Law Group

(57) ABSTRACT

A region of flexure layer, including slider mounting face coupled to offset mounting face for at least one piezoelectric device. The offset mounting face for piezoelectric device provides asymmetry between first contact region and second contact region. This is cost effective, reliable support for piezoelectric devices used for micro-actuation in hard disk drives. The slider moves based upon asymmetry of the offset mounting face coupled to the piezoelectric device twisting the slider mounting face. The invention includes flexure containing the region of the flexure layer. The invention includes head gimbal assembly including flexure, actuator arm including head gimbal assembly, and actuator assembly including actuator arm, and hard disk drive including actuator assembly. The invention includes manufacturing the region, the flexure, the head gimbal assembly, the actuator arm, the actuator assembly and the hard disk drive, as well as these products of the manufacturing processes.

29 Claims, 13 Drawing Sheets

U.S. PATENT DOCUMENTS

| | | | |
|---|---|---|---|
| 6,069,771 A * | 5/2000 | Boutaghou et al. | 360/294.4 |
| 6,118,637 A * | 9/2000 | Wright et al. | 360/294.4 |
| 6,188,548 B1 | 2/2001 | Khan et al. | |
| 6,246,552 B1 * | 6/2001 | Soeno et al. | 360/294.4 |
| 6,268,983 B1 | 7/2001 | Imada et al. | |
| 6,275,454 B1 | 8/2001 | Boutaghou | |
| 6,362,933 B1 | 3/2002 | Sampietro et al. | |
| 6,501,625 B1 | 12/2002 | Boismier et al. | |
| 6,545,846 B1 | 4/2003 | Chee et al. | |
| 6,570,730 B1 | 5/2003 | Lewis et al. | |
| 6,590,748 B2 | 7/2003 | Murphy et al. | |
| 6,611,399 B1 | 8/2003 | Mei et al. | |
| 6,718,764 B1 * | 4/2004 | Sarkar et al. | 60/527 |
| 6,760,196 B1 * | 7/2004 | Niu et al. | 360/294.6 |
| 6,930,860 B1 * | 8/2005 | Coffey | 360/294.4 |
| 6,950,266 B1 * | 9/2005 | McCaslin et al. | 360/75 |
| 7,006,333 B1 * | 2/2006 | Summers | 360/294.4 |
| 2003/0202290 A1 * | 10/2003 | Pan et al. | 360/294.4 |
| 2003/0202292 A1 * | 10/2003 | Arya et al. | 360/294.4 |
| 2004/0125510 A1 * | 7/2004 | Yang et al. | 360/294.4 |
| 2005/0152072 A1 | 7/2005 | Kwon et al. | |
| 2007/0236102 A1 * | 10/2007 | Hida et al. | 310/328 |

* cited by examiner

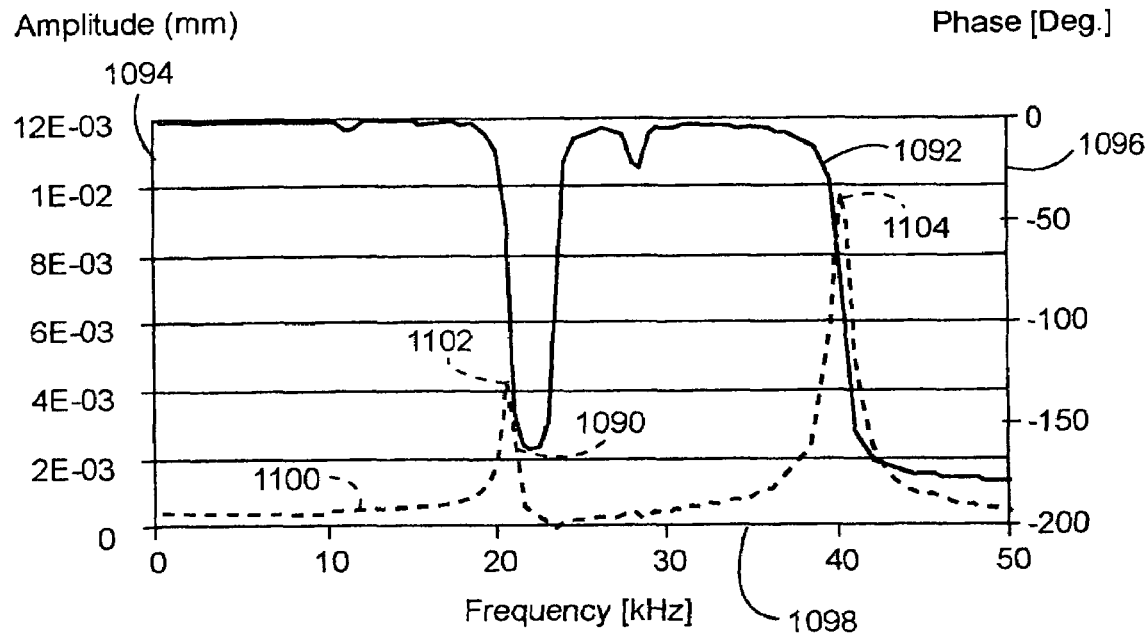
Fig. 2C
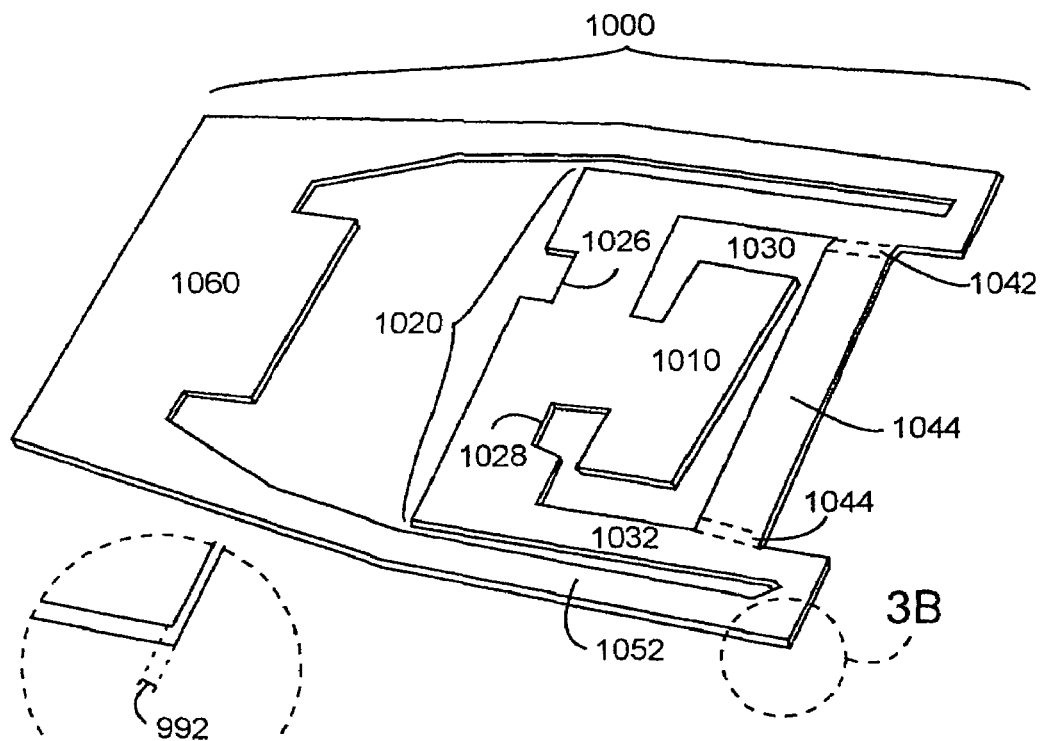
Fig. 3A
Fig. 3B

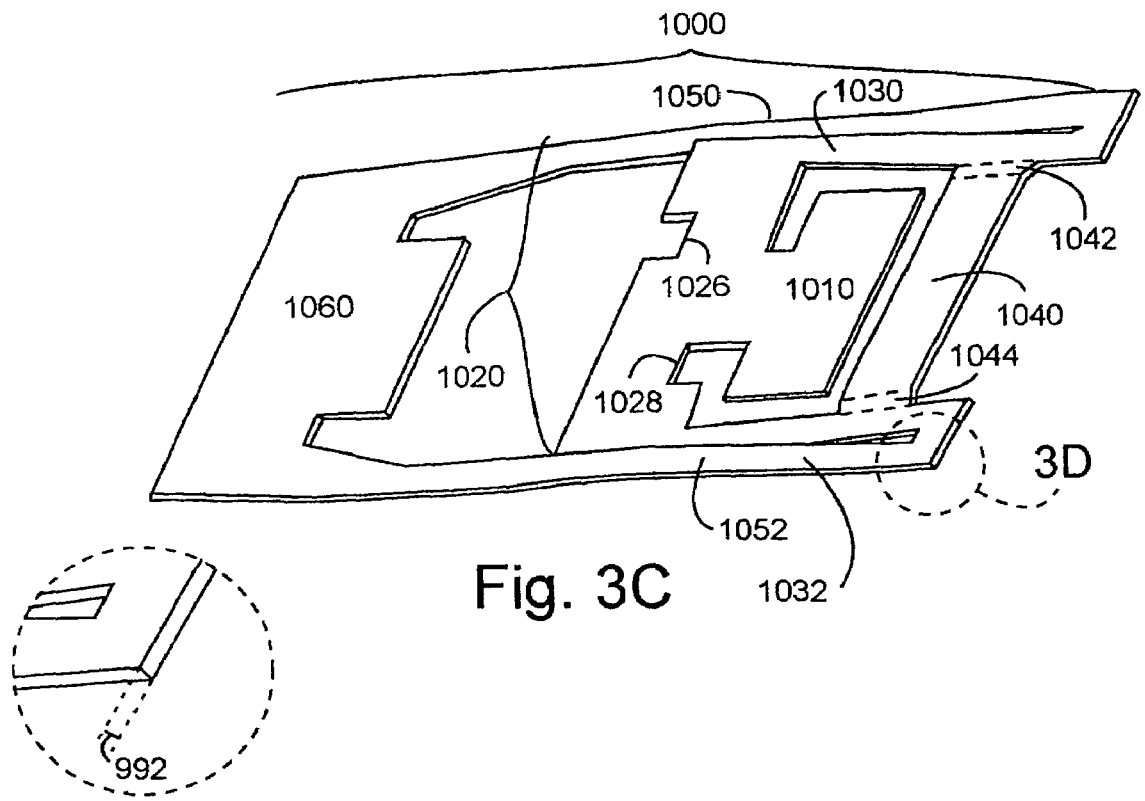
Fig. 3C
Fig. 3D
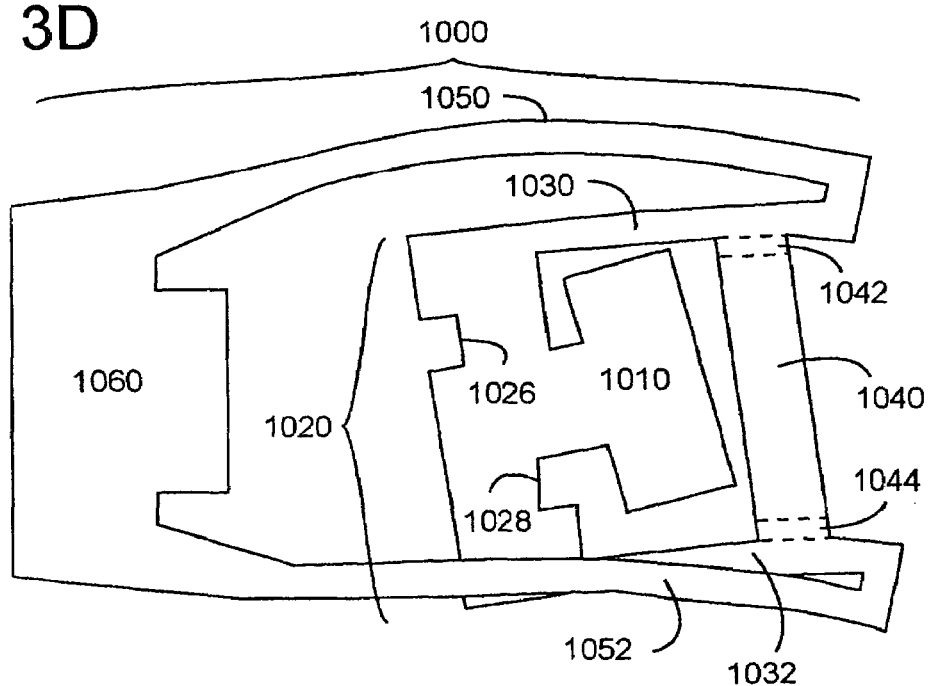
Fig. 3E

METHOD AND APPARATUS COUPLING AT LEAST ONE PIEZOELECTRIC DEVICE TO A SLIDER IN A HARD DISK DRIVE FOR MICROACTUATION

CROSS REFERENCE TO RELATED APPLICATIONS

This application is a continuation in part of application Ser. No. 10/007,259, filed Dec. 5, 2001, now U.S. Pat. No. 6,940,697 application Ser. No. 10/101,809, filed Mar. 19, 2002, now abandoned application Ser. No. 10/713,616, filed Nov. 13, 2003, now abandoned application Ser. No. 10/903,730, filed Jul. 29, 2004, now U.S. Pat. No. 7,336,436 and application Ser. No. 10/757,238, filed Jan. 13, 2004 now U.S. Pat. No. 7,130,160. This application also claims the benefit of U.S. Provisional Application No. 60/530,712, filed Dec. 18, 2003. All of the applications set forth above are incorporated herein by reference.

TECHNICAL FIELD

The invention relates to the coupling of the slider with at least one piezoelectric device for positioning the slider over a rotating disk surface within a hard disk drive.

BACKGROUND OF THE INVENTION

Hard disk drives include a servo-controller driving a voice coil actuator to position a read-write head near a track on a rotating disk surface. The read-write head communicates with the servo-controller, providing feedback, that is used to control the read-write head's positioning near the track. The read-write head is embedded in a slider and floats on a thin air bearing formed above the rotating disk surface.

The voice coil actuator traditionally positioned the slider and its read-write head over the rotating disk surface. The voice coil actuator typically includes a voice coil, that swings at least one actuator arm in response to the servo-controller. Each actuator arm includes at least one head gimbal assembly typically containing a read-write head embedded in a slider. The head gimbal assembly couples to the actuator arm in the voice coil actuator.

A hard disk drive may have one or more disks. Each of the disks may have up to two disk surfaces in use. Each disk surface in use has an associated slider, with the necessary actuator arm. Hard disk drives typically have only one voice coil actuator.

Today, the bandwidth of the servo-controller feedback loop, or servo bandwidth, is typically in the range of 1.1K Hz. Greater servo bandwidth increases the sensitivity of the servo-controller to drive the voice coil actuator to finer track positioning. Additionally, it decreases the time for the voice coil actuator to change track positions. However, increasing servo bandwidth is difficult, and has not significantly improved in years. As areal densities increase, the need to improve track positioning increases.

One answer to this need involves integrating a micro-actuator into each head gimbal assembly. These micro-actuators are devices typically built of piezoelectric composite materials, often including lead, zirconium, and tungsten. The piezoelectric effect generates a mechanical action through the application of electric power. The piezoelectric effect of the micro-actuator, acting through a lever between the slider and the actuator arm, moves the read-write head over the tracks of a rotating disk surface.

The micro-actuator is typically controlled by the servo-controller through one or two wires. Electrically stimulating the micro-actuator through the wires triggers mechanical motion due to the piezoelectric effect. The micro-actuator adds fine positioning capabilities to the voice coil actuator, that effectively extends the servo bandwidth. In the single wire approach, the servo-controller provides a DC (direct current) voltage to one of the two leads of the piezoelectric element. The other lead is tied to a shared ground. In the two wire approach, the servo-controller drives both leads of the piezoelectric element of the micro-actuator.

Micro-actuation is today in its industrial infancy. What is needed is a practical, reliable and cost effective mechanism coupling a slider to a piezoelectric device to form a micro-actuator for use in hard disk drives.

BRIEF SUMMARY OF THE INVENTION

The invention includes a region of a flexure layer. The region of the flexure layer may include a slider mounting face coupled to an offset mounting face for at least one piezoelectric device. The offset mounting face for the piezoelectric device provides an asymmetry between a first contact region and a second contact region. The flexure layer is primarily composed of a stiff material. The invention further includes a flexure containing the region of the flexure layer, as well as arms coupling the region to the flexure both mechanically and electrically.

The invention provides a cost effective, reliable region supporting piezoelectric devices that may be used for micro-actuation in hard disk drives. The region couples to a slider by the slider mounting face, and couples to the piezoelectric device by the offset mounting face. The piezoelectric device preferably couples to the offset mounting face by coupling with the first contact region and the second contact region. When the piezoelectric device contracts, the slider is moved in a first direction. When the piezoelectric device expands, the slider is moved in a second direction. The piezoelectric device contracts when stimulated by a first potential difference. The piezoelectric device expands when stimulated by a second potential difference. The slider is moved based upon the asymmetry of the offset mounting face coupled to the piezoelectric device, that twists the slider mounting face.

The invention also comprises a head gimbal assembly including the flexure, an actuator arm including the head gimbal assembly, an actuator assembly including the actuator arm, and a hard disk drive including the actuator assembly. The invention includes manufacturing methods for the region, the flexure, the head gimbal assembly, the actuator arm, the actuator assembly and the hard disk drive, as well as these products of the manufacturing processes.

BRIEF DESCRIPTION OF THE DRAWINGS

FIG. 2C shows the results of simulations of the frequency response of the apparatus of the invention to electrical excitation of the drive voltage in terms of mechanical vibration;

FIG. 3A shows the overall mechanical condition of the region near the first dent in the amplitude response of FIG. 2C, at about 12 KHz;

FIG. 3B shows an enlarged view of a portion of FIG. 3A showing the thickness of the flexure layer;

FIG. 3C shows the overall mechanical condition of the region near the second dent, at about 21 KHz;

FIG. 3D shows an enlarged view of a portion of FIG. 3C showing the thickness of the flexure layer;

FIG. 3E shows the overall mechanical condition of the region near the third dent, at about 40 KHz;

DETAILED DESCRIPTION

The invention includes a region of a flexure layer, including the following. A slider mounting face coupled to an offset mounting face for at least one piezoelectric device. The offset mounting face for the piezoelectric device provides an asymmetry between a first contact region and a second contact region. The flexure layer is primarily composed of a stiff material. The stiff material is preferably a form of stainless steel. Alternatively, the stiff material may have comparable or greater stiffness than stainless steel. The stiff material may be primarily composed of a metallic alloy. The metallic alloy may include iron, titanium and/or platinum. Alternatively, the stiff material may include a form of at least one hydrocarbon. A hydrocarbon may include at least one carbon atom and at least one hydrogen atom in a molecular bonding arrangement. The molecular bonding arrangement may implement a lattice of nano-tubes.

The invention provides a cost effective, reliable region supporting piezoelectric devices being used for micro-actuation in hard disk drives. The region couples to a slider by the slider mounting face, and couples to the piezoelectric device by the offset mounting face. The piezoelectric device preferably couples to the offset mounting face by coupling with the first contact region and the second contact region. When the piezoelectric device contracts, the slider is moved in a first direction. When the piezoelectric device expands, the slider is moved in a second direction. The piezoelectric device contracts when stimulated by a first potential difference. The piezoelectric device expands when stimulated by a second potential difference. The slider is moved based upon the asymmetry of the offset mounting face coupled to the piezoelectric device, that twists the slider mounting face.

Figure 1A:
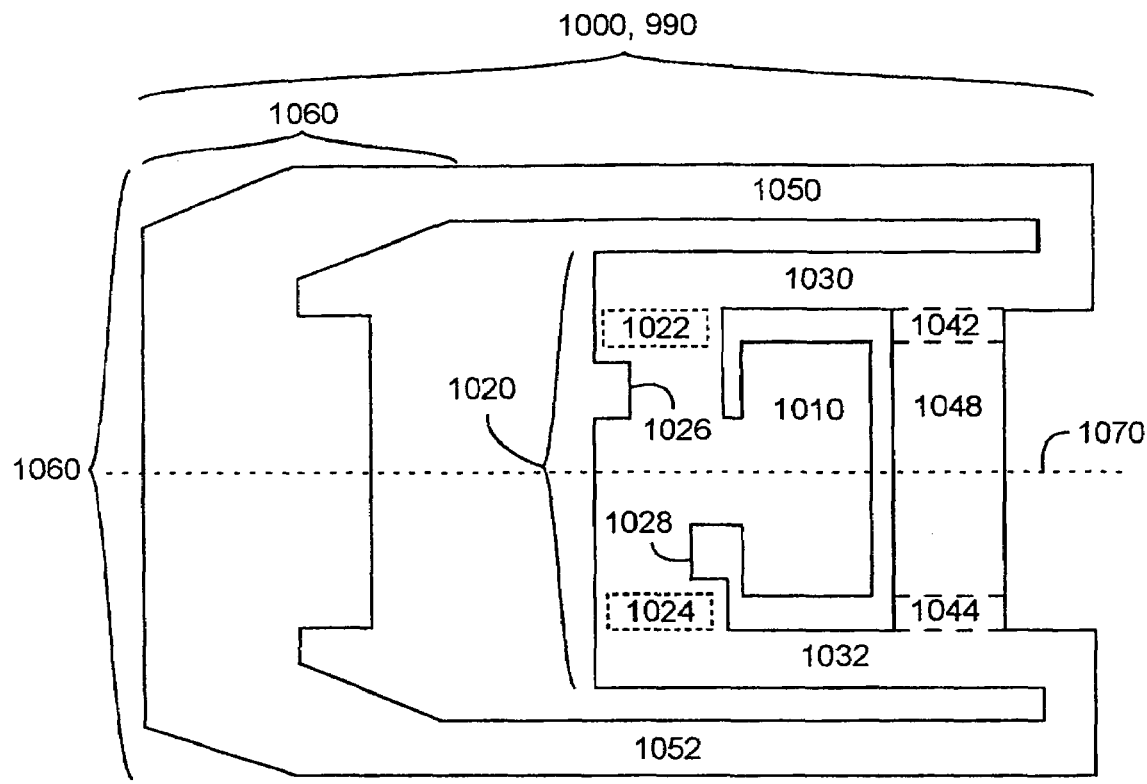
FIG. 1A shows a top view of a region of a flexure layer used in apparatus implementing the operations of the invention.
Figure 1B:
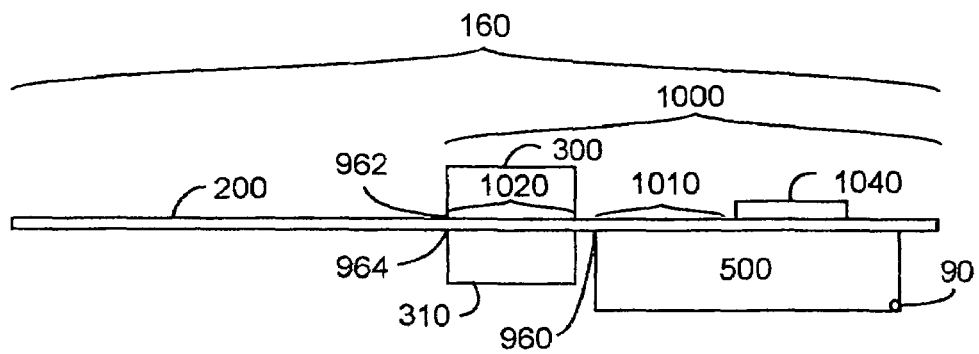
FIG. 1B shows a side view of a head gimbal assembly including the flexure layer, with the region of FIG. 1A coupled with the piezoelectric device, a second piezoelectric device and a slider.
Figure 1C:
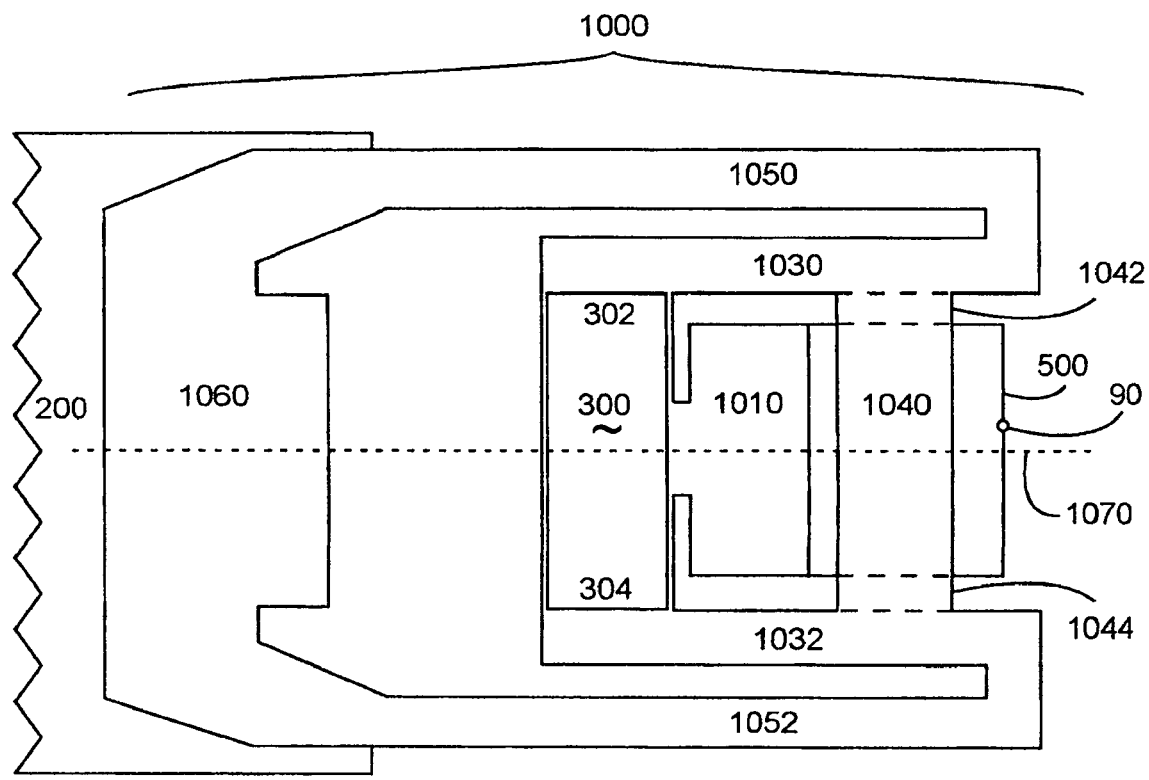
FIG. 1C shows a side view of part of the flexure layer, with the region coupled with the slider and the piezoelectric device shown in FIG. 1B.
Figure 1D:
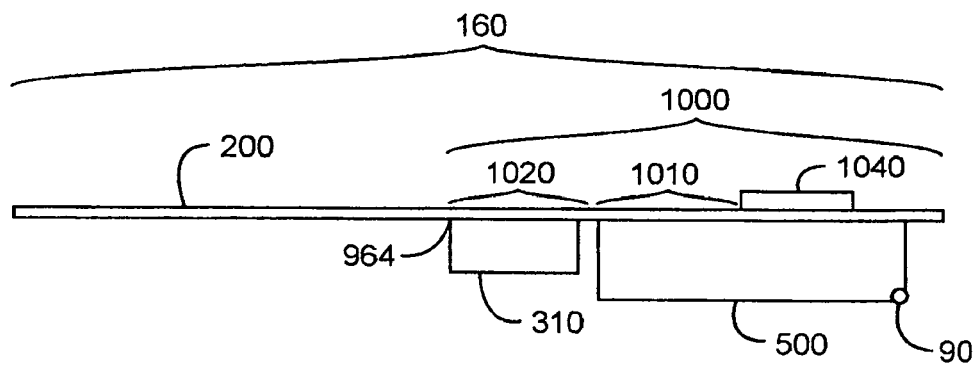
FIG. 1D shows an alternative version of FIG. 1B, including the flexure layer, the region coupled with the second piezoelectric device and the slider.
Figure 1E:
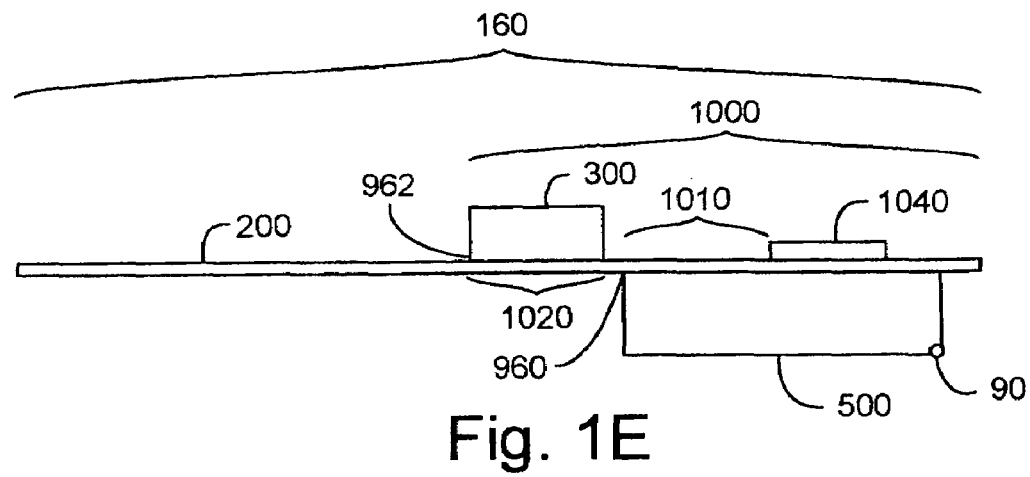
FIG. 1E shows an alternative version of FIG. 1B, including the flexure layer, the region coupled with the piezoelectric device and the slider.

FIG. 1A shows a top view of a region 1000 of the flexure layer 990 used in apparatus implementing the present invention. The region 1000 includes the following. A slider mounting face 1010 coupled to an offset mounting face 1020 for at least one piezoelectric device 300, as shown in FIGS. 1B, 1C, and 1E. The offset mounting face 1020 for the piezoelectric device 300 provides an asymmetry between a first contact region 1022 and a second contact region 1024. The flexure layer 990 is primarily composed of a stiff material.

FIG. 1B shows a side view of a head gimbal assembly 160 including the flexure cable 200, the region 1000 coupled with the piezoelectric device 300, a second piezoelectric device 310 and a slider 500. The slider 500 includes the read-write head 90, that is typically preferred to be a merged read-write magnetoresistive head.

FIG. 1C shows a side view of part of the flexure cable 200, the region 1000 coupled with the slider 500 and the piezoelectric device 300 shown in FIG. 1B. FIG. 1D shows an alternative version of FIG. 1B, including the flexure cable 200, the region 1000 coupled with the second piezoelectric device 310 and the slider 500. FIG. 1E shows an alternative version of FIG. 1B, including the flexure cable 200, the region 1000 coupled with the piezoelectric device 300 and the slider 500.

In FIGS. 1B, 1D, and 1E, the slider bridge 1040 is shown with an offset above most of the region 1000 and above the slider 500. In FIGS. 1B to 1E, the head gimbal assembly 160 includes the flexure cable 200 mechanically coupling the piezoelectric device 300 to the offset mounting face 1020. The head gimbal assembly 160 also includes the flexure cable 200 mechanically coupling the slider 500 to the slider mounting face 1010.

In FIG. 1A and 1C, a first arm 1030 couples the offset mounting face 1020 to a first mount 1042 of the slider bridge 1040. A second arm 1032 couples the offset mounting face 1020 to a second mount 1044 of the slider bridge 1040. A first outer arm 1050 couples to the first mount 1042 of the slider bridge 1040 and traverses essentially in parallel to the first arm 1030 to a flexure tab 1060. A second outer arm 1052 couples to the second mount 1044 of the slider bridge 1040 and traverses essentially in parallel to the second arm 1032 to the flexure tab 1060.

In FIG. 1A and 1C, the asymmetry provided by the offset mounting face 1020 is shown with respect to the central rest axis 1070. The central rest axis 1070 passes through the center of the region 1000, as well as the piezoelectric device 300. The offset mounting face 1020 includes a first notch 1026 and a second notch 1028 providing the asymmetry about the central rest axis 1070.

The stiff material of the flexure layer 990 of FIGS. 1A and 1C is preferably a form of stainless steel. Alternatively, the stiff material may have comparable or greater stiffness than stainless steel. The stiff material may be primarily composed of a metallic alloy. The metallic alloy may include iron, titanium and/or platinum. Alternatively, the stiff material may include a form of at least one hydrocarbon. A hydrocarbon may include at least one carbon atom and at least one hydrogen atom in a molecular bonding arrangement. The molecular bonding arrangement may implement a lattice of nano-tubes.

The slider 500 is coupled to the slider mounting face 1010 by the second mechanical coupling 960 as shown in FIGS. 1B, 1D and 1E. The piezoelectric device 300 is coupled to the offset mounting face 1020 by a first mechanical coupling 962 as shown in FIGS. 1B and 1E. The second piezoelectric device 310 is coupled to the offset mounting face 1020 by a third mechanical coupling 964 as shown in FIGS. 1B and 1D.

Figure 5:
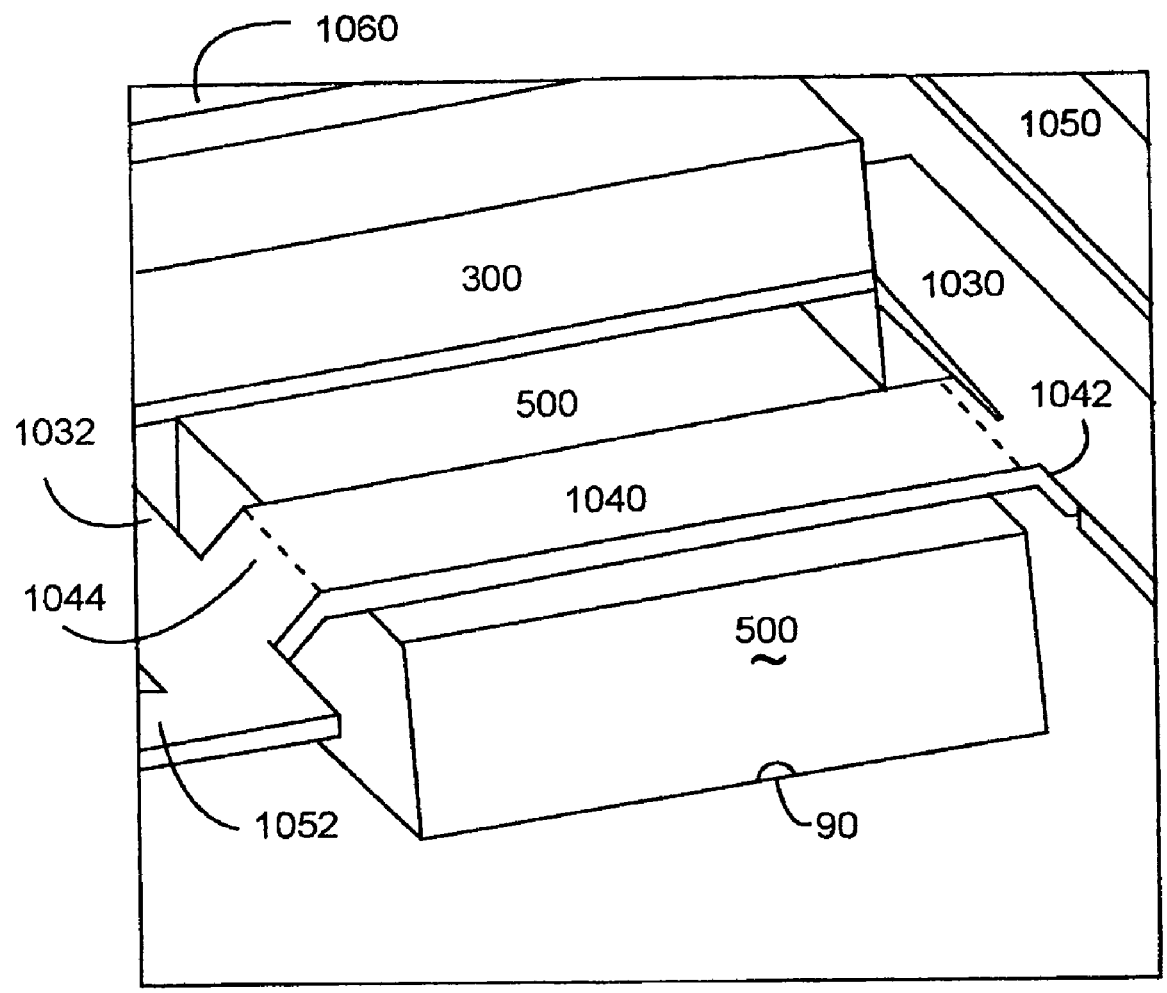
FIG. 5 shows a perspective view of part of the region of FIGS. 1B and 1C coupled to the slider and at least one piezoelectric device.

FIG. 5 shows a perspective view of part of the region 1000 of FIGS. 1B and 1C coupled to the slider 500 and at least one piezoelectric device 300.

Figure 1F:
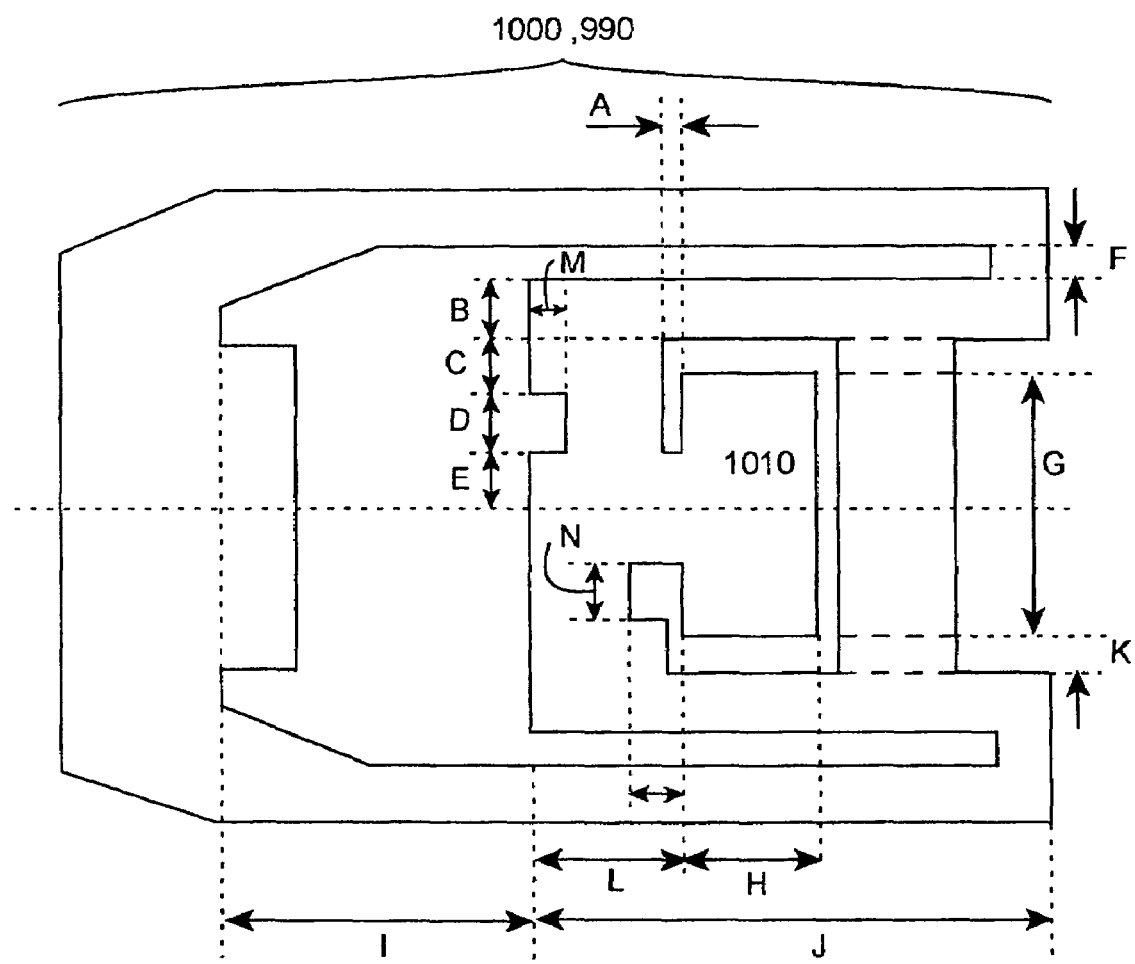
FIG. 1F shows preferred dimensions for elements of FIG. 1A.

FIG. 1F shows some preferred dimensions for components included in the region 1000 of FIG. 1A. Reference A is preferably about 50 micro-meters to within ten percent. Reference B is preferably about 150 micro-meters to within ten percent. Reference C is preferably about 150 micro-meters to within ten percent. Reference D is preferably about 150 micro-meters to within ten percent. Reference E is preferably about 150 micro-meters to within ten percent. Reference F is preferably about 100 micro-meters to within ten percent. Reference G is preferably about 700 micro-meters to within ten percent. Reference H is preferably about 350 micro-meters to within ten percent. Reference I is preferably about 800 micro-meters to within ten percent. Reference J is preferably about 1350 micro-meters to within ten percent. Reference K is preferably about 100 micro-meters to within ten percent. Reference L is preferably about 400 micro-meters to within ten percent. Reference M is preferably about 50 micro-meters to within ten percent. Reference N is preferably about 100 micro-meters to within ten percent.

Figure 2A:
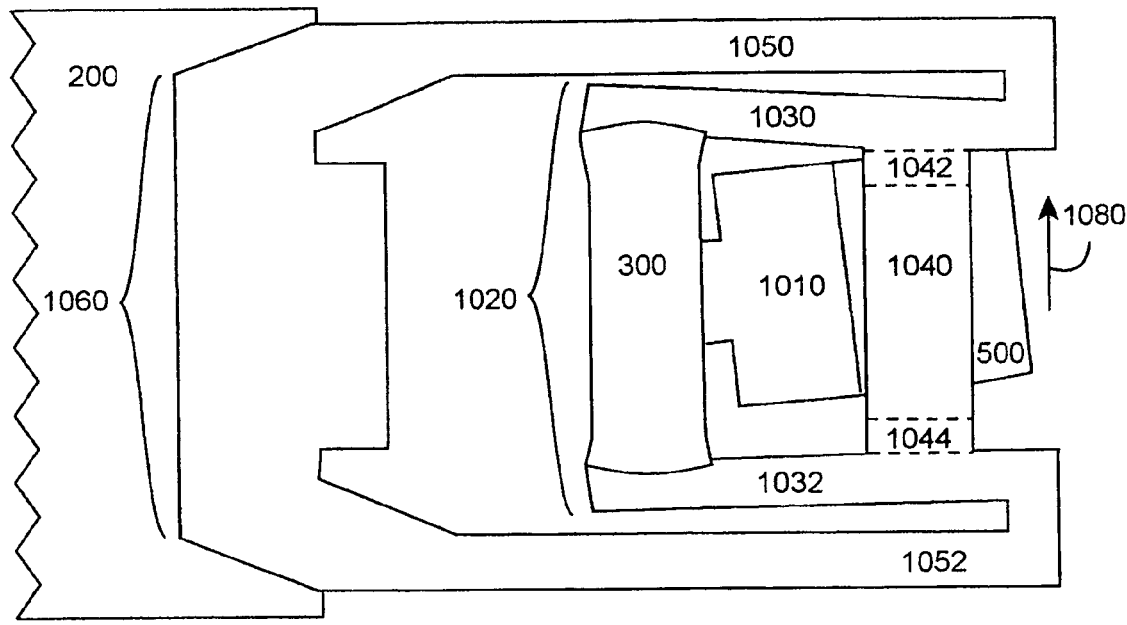
FIGS. 2A and 2B show the method of moving the slider in accord with the invention.
Figure 2B:
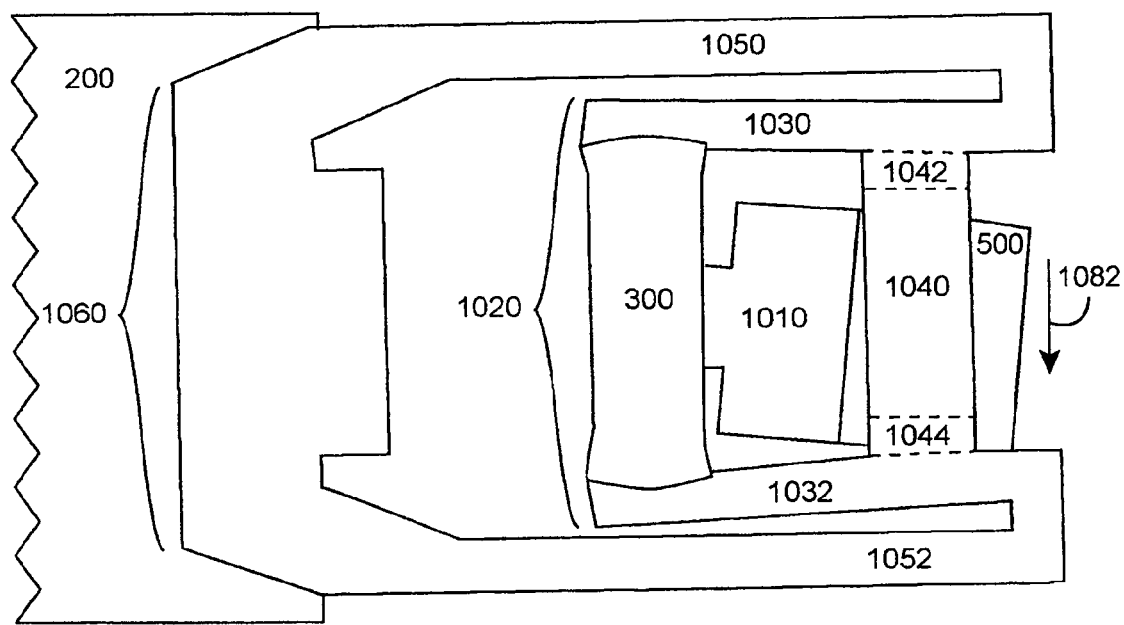

FIGS. 2A and 2B show the method of moving the slider 500 in accord with the invention. FIG. 2A shows the effect of applying a first potential difference to electrically stimulate the piezoelectric device 300 to contract, applying a first asymmetric force across the offset mounting face 1020 to move the slider 500 in a first direction 1080. The alternative embodiments using the piezoelectric device 300 and/or the second piezoelectric device 310, shown in FIGS. 1B, 1D and 1E, are applicable to FIG. 2A. Such embodiments may be preferred in various situations.

In FIG. 2A, the operation of applying the first potential difference may preferably be implemented as follows: the first potential difference is applied to electrically stimulate the piezoelectric device 300 to contract. The piezoelectric device 300 contracts, applying the first asymmetric force across the offset mounting face 1020. The offset mounting face 1020 twists under the first asymmetric force to move a slider mounting face 1010 in the first direction 1080. The slider 500 moves through the second mechanical coupling 960 to the slider mounting face 1010 in the first direction 1080.

FIG. 2B shows applying a second potential difference to electrically stimulate the piezoelectric device 300 to expand, applying a second asymmetric force across the offset mounting face 1020 to move the slider 500 in a second direction 1082. Alternative embodiments using the piezoelectric device 300 and/or the second piezoelectric device 310, shown in FIGS. 1B, 1D and 1E, are applicable to FIG. 2A. Such embodiments may be preferred in various situations.

In FIG. 2B, the operation of applying the second potential difference may preferably be implemented as follows: the second potential difference is applied to electrically stimulate the piezoelectric device 300 to expand. The piezoelectric device 300 expands, applying the second asymmetric force across the offset mounting face 1020. The offset mounting face 1020 twists under the second asymmetric force to move the slider mounting face 1010 in the second direction 1082. The slider 500 moves through the second mechanical coupling 960 to the slider mounting face 1010 in the second direction 1082.

In FIGS. 2A and 2B, the head gimbal assembly 160 is shown used in a hard disk drive 110. A disk surface is rotated to create a rotating disk surface 180. The slider 500 moves in the first direction 1080 across the rotating disk surface 180 in FIG. 2A. The slider 500 moves in the second direction 1082 across the rotating disk surface 180 in FIG. 2B.

The invention includes making the flexure cable 200, that may preferably include the following steps. Imprinting the flexure layer 990 with a mask of the region 1000 on a raw flexure to create an imprinted flexure layer. Etching the imprinted flexure layer to form the region 1000 of the flexure layer 990 in the flexure cable 200. The making of the flexure cable 200 may further include selective bending of the region 1000 to create the slider bridge 1040 coupled by the first mount 1042 and by the second mount 1044. The invention further includes the flexure cable 200 as a product of the process of making it.

FIG. 2C shows the results of simulations of the frequency response of the apparatus of the invention to mechanical vibration. The assumed conditions of these simulation are expected to be very close the real mechanical device operating conditions. The left hand axis shows the amplitude axis 1094. The right hand axis shows the phase axis 1096. The horizontal axis shows the frequency axis 1098. The dashed trace represents the amplitude response 1090. The solid trace represents the phase response 1092. The first dent 1100 in the amplitude response 1090 occurs at about 12 KHz and is shown in further detail in FIG. 3A. The second dent 1102 in the amplitude response 1090 occurs at about 21 KHz and is shown in further detail in FIG. 3C. The third dent 1104 in the amplitude response 1090 occurs at about 40 KHz and is shown in further detail in FIG. 3E.

FIG. 3A shows the overall mechanical condition of the region 1000 near the first dent 1100 in the amplitude response 1090 of FIG. 2C, at about 12 KHz. The region 1000 shows negligible distortion of the first arm 1030, the first outer arm 1050, the offset mounting face 1020, the second arm 1032, and the second outer arm 1052. The first mount 1042 and the second mount 1044 are not significantly stressed.

FIG. 3C shows the overall mechanical condition of the region 1000 near the second dent 1102, at about 21 KHz. The region 1000 shows negligible distortion of the first outer arm 1050 and the second outer arm 1052. The region 1000 shows potentially significant distortion of the first arm 1030, the offset mounting face 1020, and the second arm 1032. The first mount 1042 and the second mount 1044 are somewhat stressed.

Figure 4A:
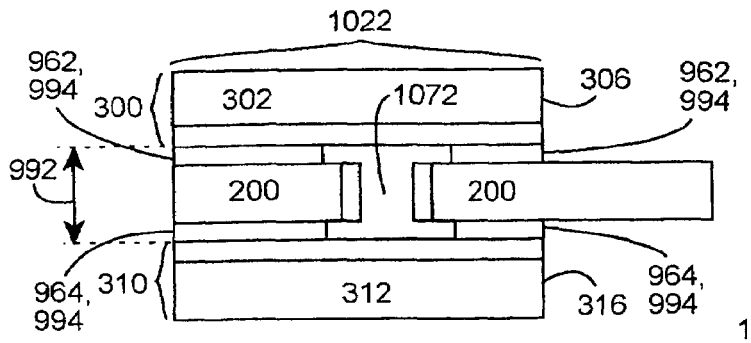
FIGS. 4A to 4E show a first scheme for electrically coupling to the piezoelectric device and/or the second piezoelectric device.
Figure 4B:
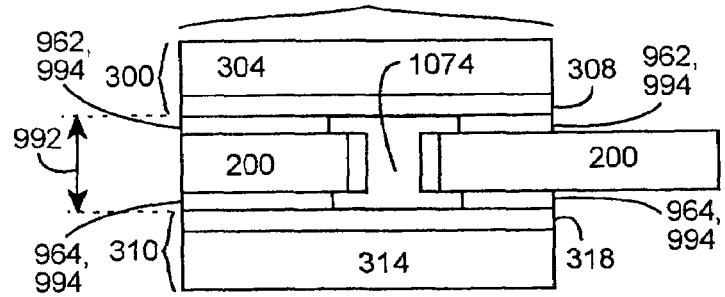

FIG. 3B shows an enlarged view of a portion of FIG. 3A showing the thickness 992 of the flexure layer 990 of FIGS. 1A and 1C. FIG. 3D shows an enlarged view of a portion of FIG. 3C showing the thickness 992 of the flexure layer 990. FIGS. 4A and 4B also show the thickness 992 of the flexure layer 990. The thickness 992 may preferably be at most fifty micro-meters. The thickness 992 may be preferred between twenty micro-meters and forty micro-meters. The thickness 992 may further be preferred between twenty-five micro-meters and thirty five micro-meters. Alternatively, the thickness 992 may preferably be at most thirty micro-meters.

FIG. 3E shows the overall mechanical condition of the region 1000 near the third dent 1104, at about 40 KHz. The region 1000 shows significant distortion of the first arm 1030, the first outer arm 1050, the offset mounting face 1020, the second arm 1032, and the second outer arm 1052. The first mount 1042 and the second mount 1044 are significantly stressed. The stress potentially alters the relationship of the slider bridge 1040 with the slider mounting face 1010, and the slider 500 when coupled.

FIGS. 4A to 4E show a first scheme for electrically coupling to the piezoelectric device 300 and/or the second piezoelectric device 310. FIGS. 6A to 6D show a second scheme.

FIG. 4A shows a cross section view of the first mechanical coupling 962 of the piezoelectric device 300 and the third mechanical coupling 964 of the second piezoelectric device 310 to the first contact region 1022 included in the offset mounting face 1020 of FIGS. 1A, 1B, 1D, and 1E.

FIG. 4B shows a cross section view of the first mechanical coupling 962 of the piezoelectric device 300 and the third mechanical coupling 964 of the second piezoelectric device 310 to the second contact region 1024 included in the offset mounting face 1020 of FIGS. 1A, 1B, 1D, and 1E.

In FIG. 4A, the second piezoelectric device 310 includes a second first-end 312 similar to the first end 302 included in the piezoelectric device 300 shown in FIGS. 1C and 4A. The piezoelectric device 300 includes a first terminal 306. The second piezoelectric device 310 includes a second-first terminal 316. The first electrical coupling 1072 is connected to the first terminal 306 of the piezoelectric device 300, forming the first connection. The first connection may further include the first electrical coupling 1072 is connected to the second-first terminal 316 of the second piezoelectric device 310.

In FIG. 4B, the second piezoelectric device 310 includes a second-second end 314 similar to the second end 304 included in the piezoelectric device 300 shown in FIGS. 1C and 4B. The piezoelectric device 300 includes a second terminal 308. The second piezoelectric device 310 includes a second-second terminal 318. The second electrical coupling 1074 is connected to the second terminal 308 of the piezoelectric device 300, forming the second connection. The second connection may further include the second electrical coupling 1074 connected to the second-second terminal 318 of the second piezoelectric device 310.

Figure 4C:
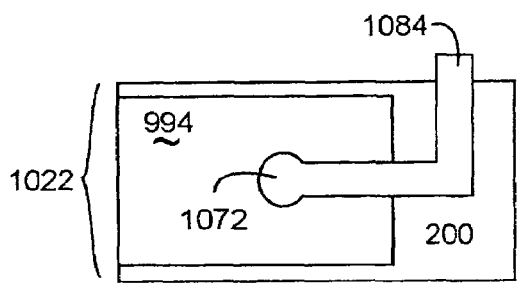

FIG. 4C shows the top view of the first contact region 1022 of FIG. 4A with the piezoelectric device 300 removed. A first conductive trace 1084, that traverses the first outer arm 1050 and the first arm 1030, to conductively couple to the first electrical coupling 1072. The second contact region 1024 of FIG. 4B is not shown with the piezoelectric device 300 removed, but may be understood through examining FIG. 4C, so that the second electrical coupling 1074 is conductively coupled by the second conductive trace 1086 shown in FIG. 10.

Figure 4D:
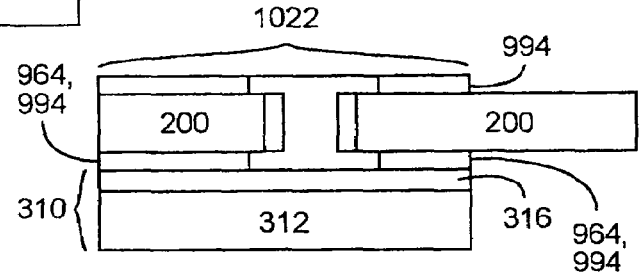

FIG. 4D shows a cross section view of the third mechanical coupling 964 of the second piezoelectric device 310 to the first contact region 1022 included in the offset mounting face 1020 of FIG. 1D. As in FIG. 4A, the second piezoelectric device 310 includes a second first-end 312. The second piezoelectric device 310 includes a second-first terminal 316. The first connection includes the first electrical coupling 1072 connected to the second-first terminal 316 of the second piezoelectric device 310.

Figure 4E:
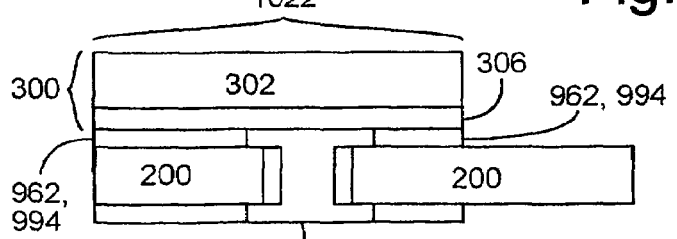

FIG. 4E shows a cross section view of the first mechanical coupling 962 of the piezoelectric device 300 to the first contact region 1022 included in the offset mounting face 1020 of FIG. 1E. The first electrical coupling 1072 is connected to the first terminal 306 of the piezoelectric device 300, forming the first connection.

In FIGS. 4A to 4E, the first mechanical coupling 962 may preferably involve the use of an adhesive 994. The third mechanical coupling 964 may preferably involve the use of the adhesive 994. The first electrical coupling 1072 may preferably be implemented as a plated through hole in the flexure cable 200. The second electrical coupling 1074 may preferably be implemented as a second plated through hole in the flexure cable 200.

Figure 6A:
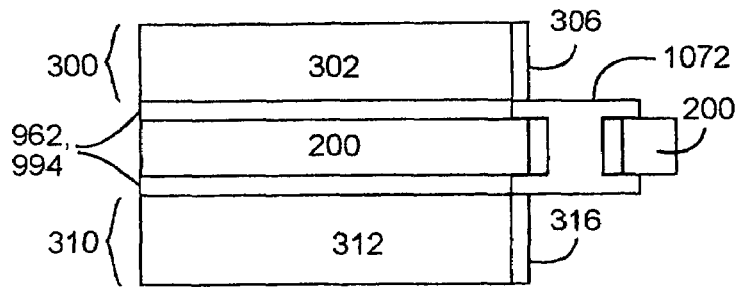
FIGS. 6A to 6D show a second scheme for electrically coupling to the piezoelectric device and/or the second piezoelectric device.
Figure 6B:
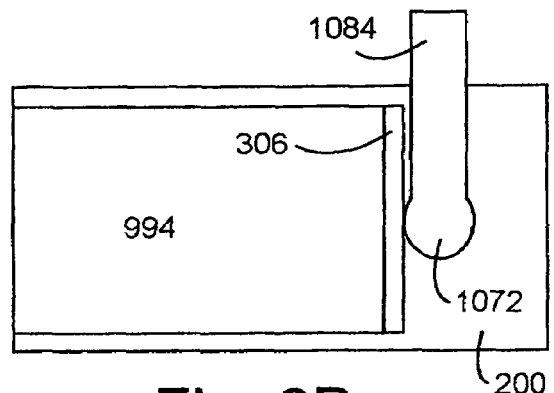
Figure 6C:
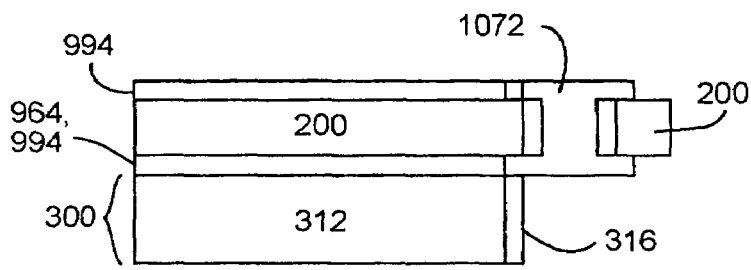
Figure 6D:
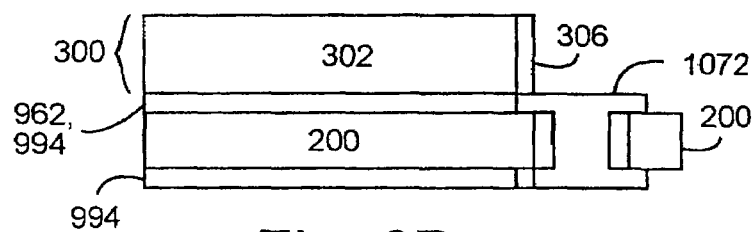
Figure 7:
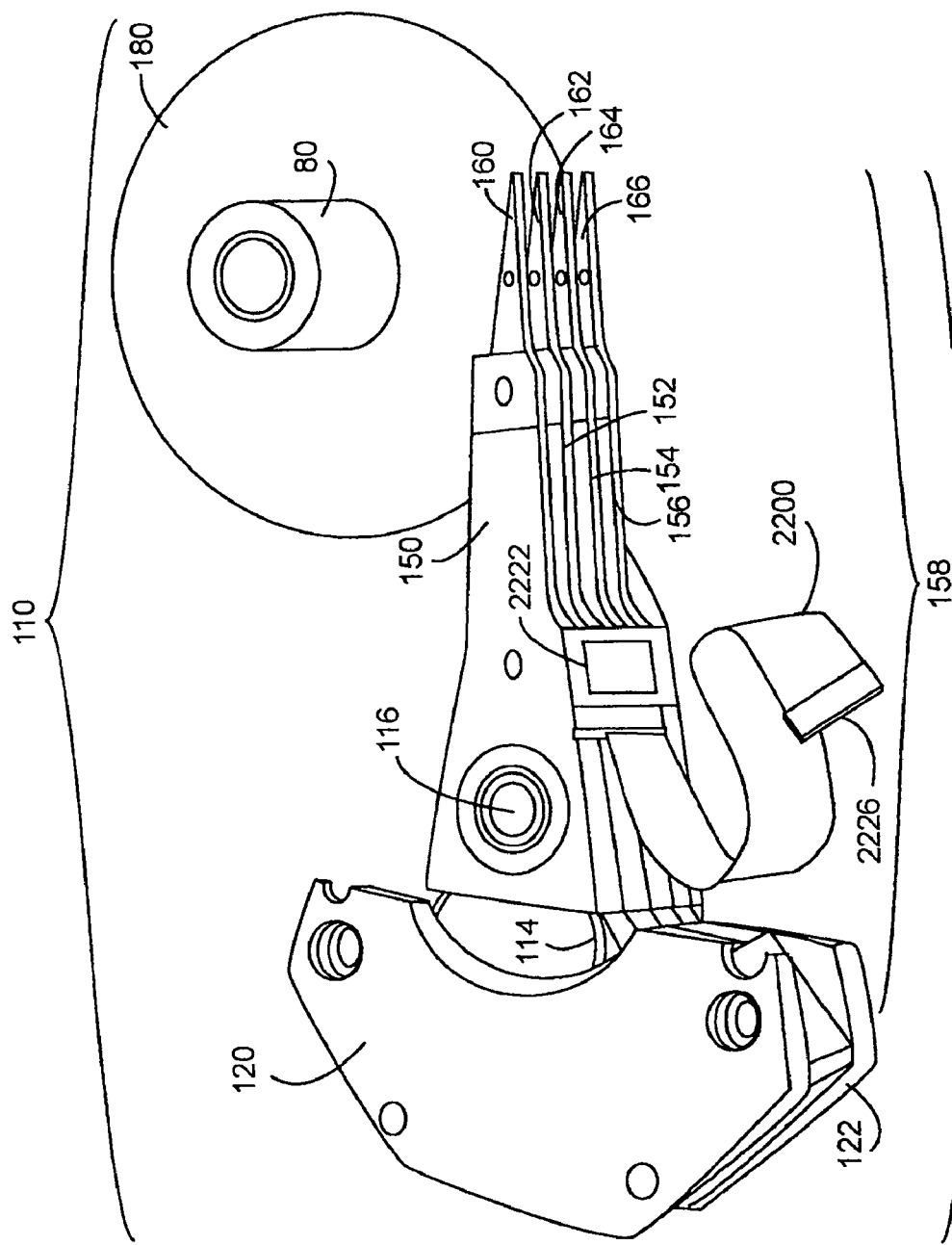
FIG. 7 shows the hard disk drive including a voice coil actuator, including an actuator assembly, that includes the head gimbal assembly of FIGS. 1B, 1D and 1E.
Figure 8A:
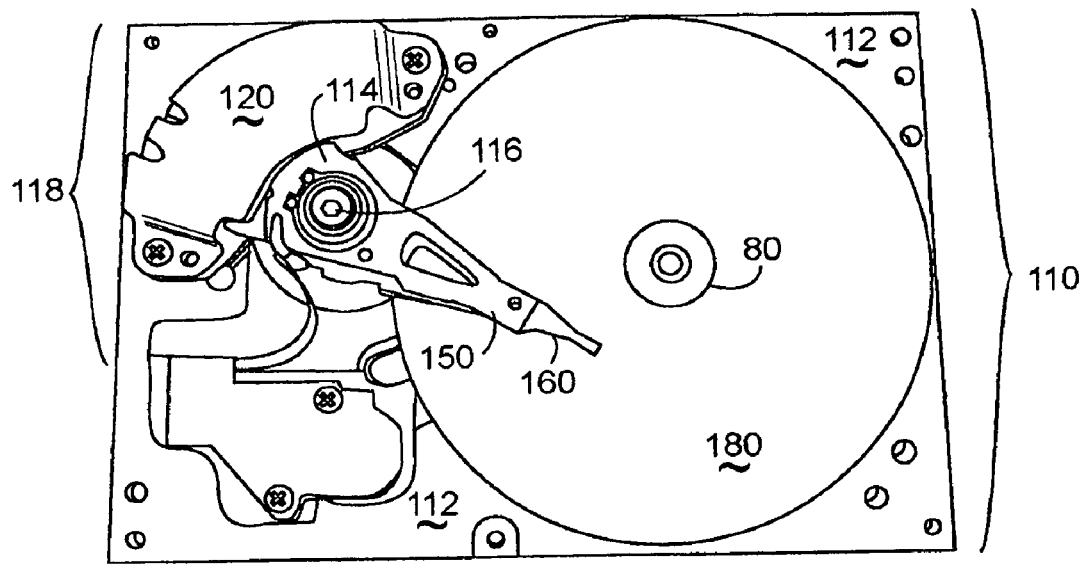
FIGS. 8A and 8B show the hard disk drive of FIG. 7 with the slider moving over a rotating disk surface, being positioned by the piezoelectric device through the invention's region in accord with the operations discussed for FIGS. 2A and 2B.
Figure 8B:
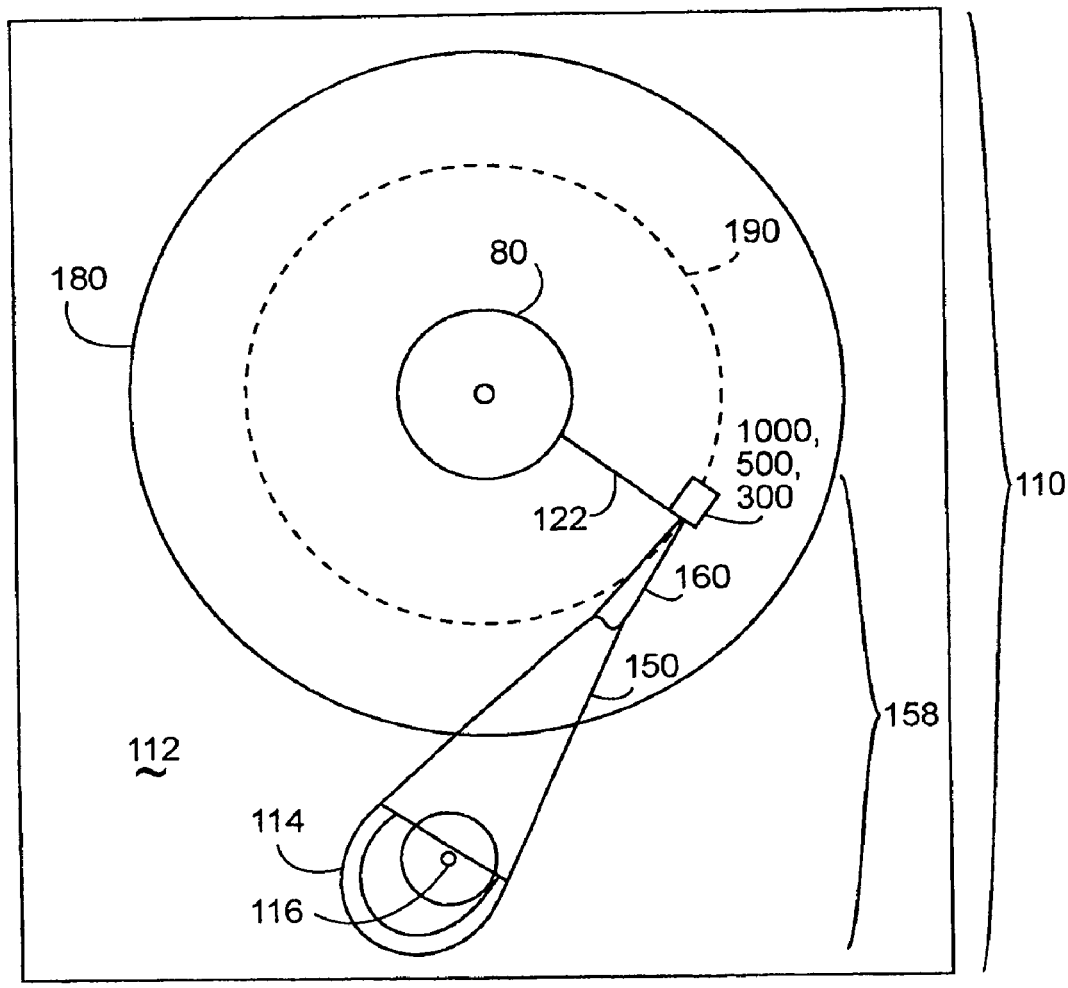
Figure 9:
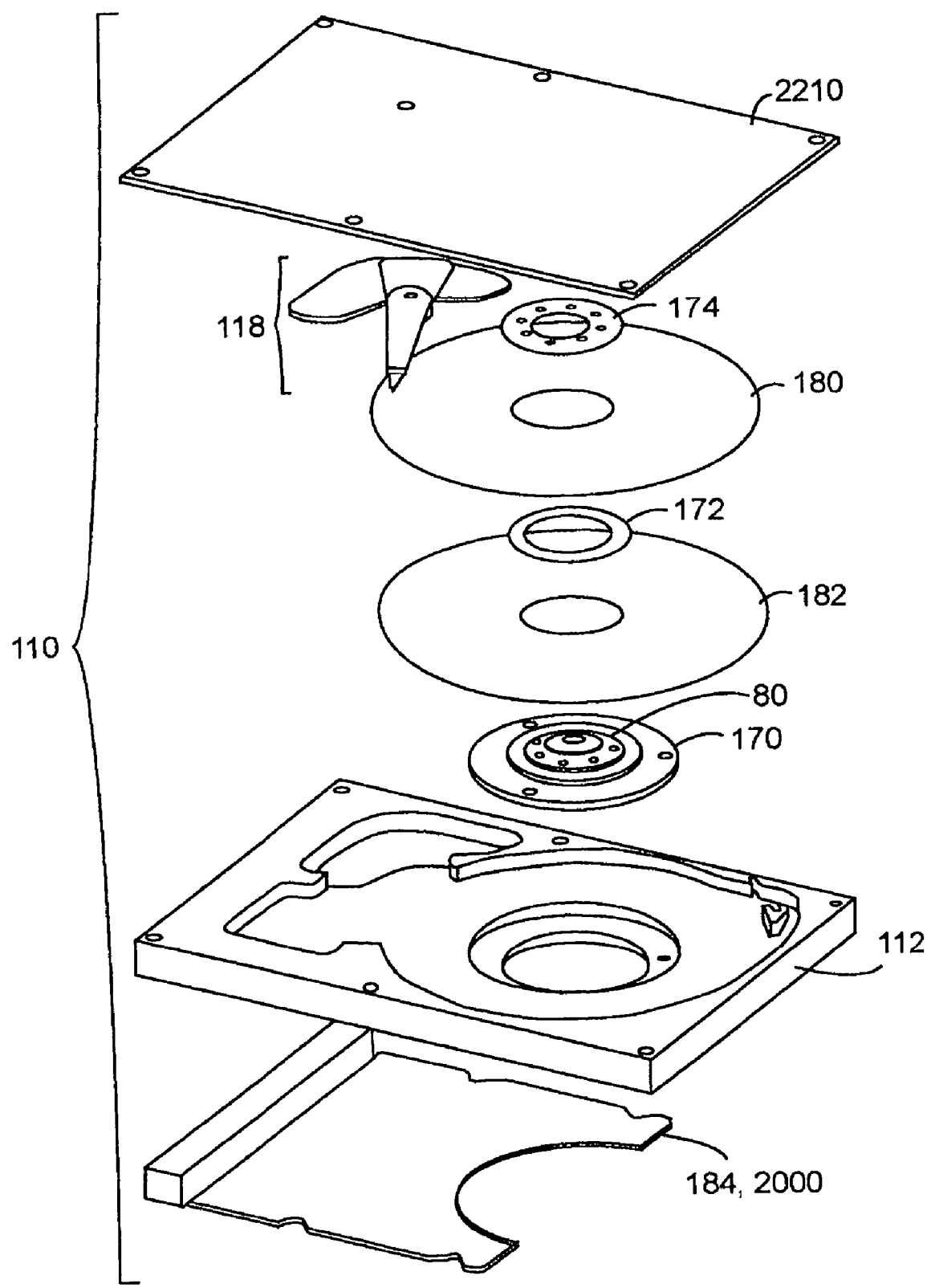
FIG. 9 shows an exploded view of the primary components of the hard disk drive of FIGS. 7 to 8B.

FIG. 6A shows a cross section view of the second scheme with the first mechanical coupling 962 of the piezoelectric device 300 and the third mechanical coupling 964 of the second piezoelectric device 310 to the first contact region 1022 of FIGS. 1B and 1C. FIG. 6B shows the top view of the first contact region 1022 of FIG. 6A with the piezoelectric device 300 removed. A first conductive trace 1084, that traverses the first outer arm 1050 and the first arm 1030, conductively couples to the first electrical coupling 1072. FIG. 6C shows a cross section view of the second scheme with the third mechanical coupling 964 of the second piezoelectric device 310 to the first contact region 1022 of FIG. 1D. FIG. 6D shows a cross section view of the second scheme with the first mechanical coupling 962 of the piezoelectric device 300 to the first contact region 1022 of FIG. 1E. FIG. 7 shows the hard disk drive 110 including a voice coil actuator 118, including an actuator assembly 158, that includes the head gimbal assembly 160 of FIGS. 1B, 1D and 1E. FIGS. 8A and 8B show the hard disk drive 110 of FIG. 7 with the slider 500 moving over a rotating disk surface 180, being positioned by the piezoelectric device 300 through the invention's region 1000 in accord with the operations discussed for FIGS. 2A and 2B. FIG. 9 shows an exploded view of the primary components of the hard disk drive 110 of FIGS. 7 to 8B.

In FIGS. 7 to 8B, the actuator arm 150 preferably includes the head gimbal assembly of FIGS. 1B, 1D, and 1E. The actuator assembly 158 preferably includes the actuator arm 150. The actuator assembly 158 is included in the voice coil actuator 118.

The invention includes the voice coil actuator 118 shown in FIGS. 7 to 9 built with the flex circuitry 2200 coupled through at least one flexure cable 200 with the head gimbal assembly 160. The voice coil actuator 118 may include coupling more than one head gimbal assembly through more than one flexure cable. By way of example, the flex circuitry 2200 may couple through a second flexure cable 220 with a second head gimbal assembly 162. The flex circuitry 2200 may couple through a third flexure cable 260 with a third head gimbal assembly 164. The flex circuitry 2200 may couple through a fourth flexure cable 280 with a fourth head gimbal assembly 166.

As shown in FIGS. 7 to 9, an actuator arm may include more than one head gimbal assembly. By way of example, the second actuator arm 152 may preferably include the second head gimbal assembly 162 and the third head gimbal assembly 164. Such an actuator arm may be preferred to minimize manufacturing expense in accessing two rotating disk surfaces (that are not shown) and may further improve the overall reliability of the hard disk drive 110.

The invention also includes the hard disk drive 110 built with the voice coil actuator 118. The voice coil actuator 118 includes an assembly of at least one actuator arm 150, and as shown, may include additional actuator arms 152, 154 and 156. A disk surface is shown, that when the invention is in operation, rotates about spindle 80 to create the rotating disk surface 180.

The voice coil actuator 118 includes the actuator assembly 158 pivoting about the actuator pivot 116. The actuator assembly 158 includes the actuator arm 150 coupled with the voice coil 114. When the voice coil 114 is electrically stimulated with a time-varying electrical signal, it inductively interacts with a fixed magnet attached to the voice coil yoke 120, causing the actuator arm 150 to pivot by lever action through the actuator pivot 116. Typically, the fixed magnet is composed of two parts, one attached to the voice coil yoke 120 and the other attached to the bottom voice coil yoke 122. As the actuator arm 150 pivots, the head gimbal assembly 160 is moved across the rotating disk surface 180. This provides the coarse positioning of the slider 500, and consequently the read-write head 90 over the specific track 190.

Figure 10:
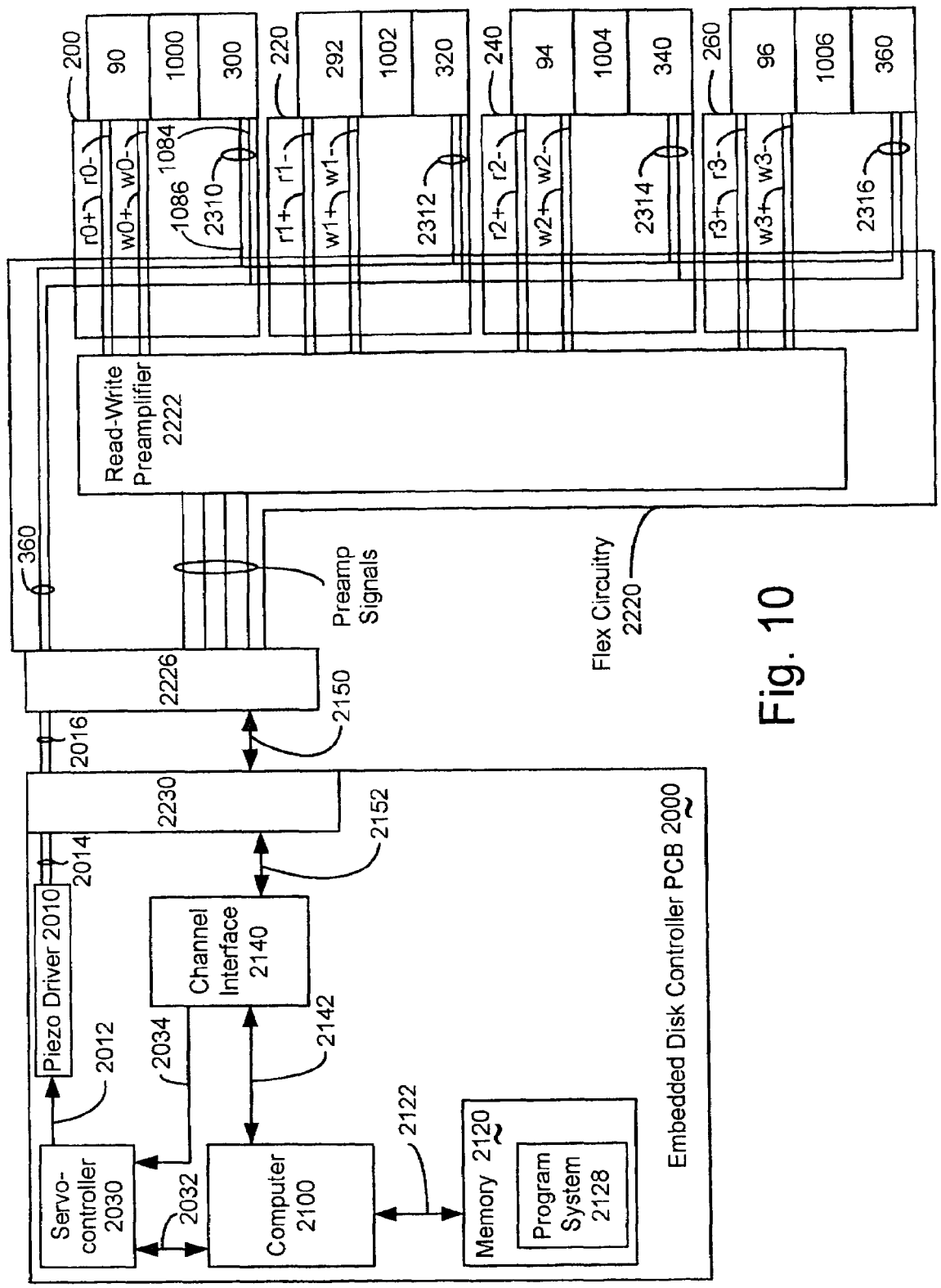
FIG. 10 shows a schematic view of the electrical interconnection of the read-write head, the piezoelectric device, for at least one head gimbal assembly of FIGS. 1B, 1D, 1E, and 7 to 9.

FIG. 10 shows a schematic view of the electrical interconnection of the embedded disk controller printed circuit board 2000 with the read-write head 90, the piezoelectric device 300, and at least one head gimbal assembly 160, that is used to provide fine positioning for the read-write head 90.

In FIG. 10, the first conductive trace 1084 of FIGS. 4C and 6B is one of two signals in the piezo-control signal bundle 2310 in the flexure cable 200. The piezo-control signal bundle 2310 further includes a second signal, that is the second conductive trace 1086.

In certain preferred embodiments, there may be more than one flexure cable, as shown in FIG. 10. In certain further preferred embodiments, the piezo-control signal bundles may each conduct through a shared signal bundle 360. The second flexure cable 220 may include the second piezo-control signal bundle 2312 conducting the shared signal bundle 360. The third flexure cable 260 may include the third piezo-control signal bundle 2314 conducting the shared signal bundle 360. The fourth flexure cable 280 may include the fourth piezo-control signal bundle 2316 conducting the shared signal bundle 360.

In FIG. 10, the flex circuitry 2200 may preferably include a read-write preamplifier 2222 coupling with the read differential signal pair r0+ r0− and the write differential signal pair w0+ w0−. The read and write differential signal pairs electrically couple with the read-write head 90 within the slider 500, as shown in FIGS. 1B to 1E. A flex connector 2226 may preferably couple to the printed circuit board connector 2230 to provide piezo-controls 1016 to the shared signal bundle 360 and the preamplifier signal interactions 2150 with the read-write preamplifier 2222. The channel interface 2140 interacts 2152 through the connectors to provide the preamplifier signal interactions 2150 of the read-write preamplifier 2222. The piezo driver 2010 provides the raw piezo drive signal bundle 1014 to the printed circuit board connector 2230.

In FIG. 10, a computer 2100 preferably directs the channel interface 2140 and the servo-controller 2030. As used herein a computer will include, but is not limited to, an instruction processor. The instruction processor includes at least one instruction processing element and at least one data processing element, each data processing element controlled by at least one instruction processing element. A computer may also include, but is not limited to, at least one finite state machine, at least one inference engine and at least one neural network.

In FIG. 10, the servo-controller 2030 interacts through servo-signaling 2032 with the computer 2100. The servo-controller 2030 also receives at least one position feedback signal 2034. The position feedback signal 2034 often and preferably includes a Position Error Signal (PES). The position feedback signal 2034 is preferably used in the dynamic control system formed by the computer 2100, the servo-controller 2030 and the piezoelectric device 300 to move the slider 500 in accord with the invention.

More specifically, the fine motion control provided by the operations of FIGS. 2A and 2B may preferably position the slider 500 over a small number of neighboring tracks to a specific track 190 as shown in FIG. 8B. By way of example, the small number of neighboring tracks may number less than twenty. The small number of neighboring tracks may further number less than ten. The small number of neighboring tracks may preferably number about five.

The positioning of the slider 500 may be at least partly implemented by a program system 2128 as shown in FIG. 10. The program system 2128 preferably includes program steps residing in the memory 2120. The memory 2120 is accessibly coupled 2122 with the computer 2100.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method comprising the step of:
   moving a slider (500) coupled to a flexure cable (200) through a slider mounting face (1010) coupled to an offset mounting face (1020) and coupled to at least one piezoelectric device (300),
   with said slider mounted to said slider mounting face by a mechanical coupling (960),
   with said offset mounting face for said piezoelectric device providing an asymmetry to said slider mounting face between a first contact region (1022) and a second contact region (1024) mechanically coupled (962) with said piezoelectric device, and
   with said flexure cable including said slider mounting face coupled to said offset mounting face and configured to provide electrical stimulus to a first terminal (306) and a second terminal (308) of said piezoelectric device,
   wherein the step of moving comprising the step of:
   applying a first potential difference by said flexure cable between said first terminal and said second terminal to electrically stimulate said piezoelectric device to contract to apply a first asymmetric force from between said first contact region and said second contact region and across said offset mounting face to move said slider in a first direction (1080) through said second mechanical coupling.

2. The method of claim 1, wherein the step applying said first potential difference, further comprising the steps of:
   said offset mounting face twisting under said first asymmetric force to move said slider mounting face in said first direction.

3. The method of claim 2, further comprising the step of:
   rotating a disk surface in a hard disk drive including said sllider and said piezoelectric device to create a rotating disk surface;
   wherein the step of said slider moving in said first direction is further comprised of the step of:
   said slider moving in said first direction across said rotating disk surface.

4. The method of claim 1, wherein the step moving said slider further comprises the step of:
   applying a second potential difference by said flexure cable between said first terminal and said second terminal to electrically stimulate said piezoelectric device to expand and apply a second asymmetric force from between said first contact region and said second contact region and across said offset mounting face to move said slider in a second direction (1082).

5. The method of claim 4, wherein the step applying said second potential difference, further comprising the steps of:

said offset mounting face twisting under said second asymmetric force to move said slider mounting face in said second direction.

6. A method comprising the step of:
operating a head gimbal assembly (160) to move a slider (500) coupled to a flexure cable (200) through a slider mounting face (1010) coupled to an offset mounting face (1020),
with said offset mounting face coupled with at least one piezoelectric device (300) at a first contact region 302 and a second contact region 304, and
with said flexure cable including said slider mounting face coupled to said offset mounting face and configured to provide electrical stimulus to a first terminal (306) and a second terminal (308) of said piezoelectric device, comprising the steps of:
applying a first potential difference by said flexure cable between said first terminal and said second terminal to electrically stimulate said piezoelectric device to contract to apply a first asymmetric force from between said first contact region and said second contact region and across said offset mounting face to move said slider in a first direction (1080) through a second mechanical coupling (960); and
applying a second potential difference by said flexure cable between said first terminal and said second terminal to electrically stimulate said piezoelectric device to expand to apply a second asymmetric force from between said first contact region and said second contact region and across said offset mounting face to move said slider in a second direction (1082);
wherein by said offset mounting face provides an asymmetry between a first contact region and a second contact region to said slider mounting face;
wherein said first contact region and said second contact region each couple to said piezoelectric device through a first mechanical coupling (962).

7. The method of claim 6,
wherein the step applying said first potential difference, is further comprised of the step:
applying said first potential difference to electrically stimulate a second of said piezoelectric devices (310) to move said slider in said first direction through said second mechanical coupling; and
wherein the step applying said second potential difference, is further comprised of the step:
applying said second potential difference to electrically stimulate said second of said piezoelectric devices to move said slider in said second direction.

8. The method of moving said slider of claim 6, wherein the step applying said first potential difference, further comprising the steps of:
said offset mounting face twisting under said first asymmetric force to move a slider mounting face in said first direction.

9. The method of claim 8, further comprising the step of:
rotating a disk surface in a hard disk drive to create a rotating disk surface;
wherein the step of said slider moving in said first direction is further comprised of the step of:
said slider moving in said first direction across said rotating disk surface.

10. The method of claim 6, wherein the step applying said second potential difference, further comprising the steps of:
said offset mounting face twisting under said second asymmetric force to move said slider mounting face in said second direction.

11. The method of claim 10, further comprising the step of:
rotating a disk surface in a hard disk drive to create a rotating disk surface;
wherein the step of said slider moving in said second direction is further comprised of the step of:
said slider moving in said second direction across said rotating disk surface.

12. A head gimbal assembly, comprising:
a piezolectric device (300) including a first terminal (306) and a second terminal (308);
a flexure cable (200) including a slider mounting face (1010) coupled to an offset mounting face (1020) first mechanically coupled (962) to said piezoelectric device between a first contact region (1022) and a second contact region (1024);
a slider (500) second mechanically coupling (962) to said slider mounting face;
means for applying a first potential difference by said flexure cable between said first terminal and said second terminal to electrically stimulate said piezoelectric device to contract to apply a first asymmetric force between said first contact region and said second contact region across said offset mounting face to move said slider in a first direction (1080) through said second mechanical coupling; and
means for applying a second potential difference by said flexure cable between said first terminal and said second terminal to electrically stimulate said piezoelectric device to contract to apply a second asymmetric force between said first contact region and said second contact region across said offset mounting face to move said slider in a second direction (1082).

13. The head gimbal assembly of claim 12,
wherein the means for applying said first potential difference, further comprises:
means for applying said first potential difference to electrically stimulate a second of said piezoelectric devices (310) to move said slider in said first direction; and
wherein the means for applying said second potential difference, further comprises:
means for applying said second potential difference to electrically stimulate said second of said piezoelectric devices (310) to apply said second asymmetric force across said offset mounting face to move said slider in said second direction;

14. The head gimbal assembly of claim 12, wherein the means for applying said first potential difference, further comprising:
means for said offset mounting face twisting under said first asymmetric force to move a slider mounting face in said first direction.

15. The head gimbal assembly of claim 12, wherein the means for applying said second potential difference, further comprising:
means for said offset mounting face twisting under said second asymmetric force to move said slider mounting face through said slider mount neck in said second direction.

16. A hard disk drive, comprising:
a disk base;
a spindle motor mounted on said disk base and rotatably coupled to at least one disk to create at least one rotating disk;
an actuator assembly pivotably coupled to said disk base and coupling through said head gimbal assembly of claim 12 to said slider through said flexure cable including said at least one piezoelectric device; and said hard disk drive is configured to apply said first potential difference to electrically stimulate at least one piezoelectric device to contract to apply said first asymmetric force across said offset mounting face to move said slider in said first direction through said second mechanical coupling, and to apply said second potential difference to electrically stimulate said piezoelectric device to contract to apply said second asymmetric force across said offset mounting face to move said slider in said second direction.

17. A voice coil actuator, comprising:

an actuator assembly coupling through said head gimbal assembly of claim 12 to said slider through said flexure cable including said at least one piezoelectric device; and wherein said voice coil actuator is configured to apply said first potential difference to electrically stimulate said at least one piezoelectric device to contract to apply said first asymmetric force across said offset mounting face to move said slider in said first direction through said second mechanical coupling, and to apply said second potential difference to electrically stimulate said piezoelectric device to contract to apply said second asymmetric force across said offset mounting face to move said slider in said second direction.

18. The head gimbal assembly claim 12, wherein said flexure cable including a region of a flexure layer, comprising:

said slider mounting face coupled to said offset mounting face for said at least one piezoelectric device;

said offset mounting face for said piezoelectric device providing said asymmetry between said first contact region and said second contact region;

wherein said flexure layer is primarily composed of a stiff material.

19. The head gimbal assembly of claim 18, wherein said offset mounting face includes a first notch and a second notch providing said asymmetry.

20. The head gimbal assembly of claim 18, wherein said stiff material is a form of stainless steel.

21. The head gimbal assembly of claim 18, wherein said stiff material has comparable or greater stiffness than a form of stainless steel.

22. The head gimbal assembly of claim 21, wherein said stiff material is primarily composed of a metallic alloy.

23. The head gimbal assembly of claim 21, wherein said stiff material is primarily composed of a form of at least one hydrocarbon compound.

24. The head gimbal assembly of claim 18, wherein the thickness of said flexure layer is at most fifty micro-meters.

25. The head gimbal assembly claim 24, wherein said thickness is at least twenty micro-meters.

26. The head gimbal assembly of claim 24 wherein said thickness of said flexure layer is at most thirty micro-meters.

27. The head gimbal assembly of claim 18, wherein said flexure cable further comprising:

a first arm coupling said offset mounting face to a first mount of a slider bridge;

a second arm coupling said offset mounting face to a second mount of said slider bridge;

a first outer arm coupling to said first mount of said slider bridge and traversing essentially in parallel to said first arm to a flexure tab; and a second outer arm coupling to said second mount of said slider bridge and traversing essentially in parallel to said second arm to said flexure tab.

28. The head gimbal assembly of claim 27, wherein said flexure cable further comprises:

a first conductive trace traversing said first outer arm and traversing said first arm to conductively couple to a first electrical coupling near said offset mounting face; and a second conductive trace traversing said second outer arm and traversing said second arm to conductively couple to a second electrical coupling near said offset mounting face;

wherein said head gimbal assembly, further comprises:

a first connection of said first electrical coupling to a first terminal of said piezoelectric device; and a second connection of said second electrical coupling to a second terminal of said piezoelectric device.

29. A method comprising the step of:

moving a slider (500) in a direction (1082) through a flexure cable with said slider mounted on a slider mounting face (1010) by a mechanical coupling (960), said slider mounting face coupled to an offset mounting face (1020) and coupled to at least one piezoelectric device (300), with said offset mounting face for said piezoelectric device providing an asymmetry between a first contact region (1022) and a second contact region (1024) coupling to said piezoelectric device, and with said flexure cable including said slider mounting face coupled to said offset mounting face and configured to provide electrical stimulus to a first terminal (306) and a second terminal (308) of said piezoelectric device, wherein the step of moving comprises the step of:

applying a potential difference by said flexure cable between said first terminal and said second terminal to electrically stimulate said piezoelectric device to expand and apply an asymmetric force across said offset mounting face to move said slider in said direction.

\* \* \* \* \*